(12) United States Patent
Kuhn et al.

(10) Patent No.: US 10,185,485 B2
(45) Date of Patent: Jan. 22, 2019

(54) METHOD AND APPARATUS FOR PROVIDING A GRAPHICAL USER INTERFACE IN A VEHICLE

(71) Applicant: VOLKSWAGEN AKTIENGESELLSCHAFT, Wolfsburg (DE)

(72) Inventors: Mathias Kuhn, Berlin (DE); Indra-Lena Kögler, Berlin (DE); Alexander Hahn, Braunschweig (DE)

(73) Assignee: Volkswagen Aktiengesellschaft (DE)

( * ) Notice: Subject to any disclaimer, the term of this patent is extended or adjusted under 35 U.S.C. 154(b) by 130 days.

(21) Appl. No.: 14/900,147

(22) PCT Filed: Mar. 3, 2014

(86) PCT No.: PCT/EP2014/054071
§ 371 (c)(1),
(2) Date: Dec. 19, 2015

(87) PCT Pub. No.: WO2015/131921
PCT Pub. Date: Sep. 11, 2015

(65) Prior Publication Data
US 2016/0370984 A1     Dec. 22, 2016

(51) Int. Cl.
*G06F 3/0482* (2013.01)
*G06F 3/0484* (2013.01)
(Continued)

(52) U.S. Cl.
CPC .......... *G06F 3/04847* (2013.01); *B60K 35/00* (2013.01); *B60K 37/02* (2013.01);
(Continued)

(58) Field of Classification Search
CPC .................................................. G06F 3/04847
See application file for complete search history.

(56) References Cited

U.S. PATENT DOCUMENTS 8,908,039 B2 * 12/2014 De Wind ............... B60K 35/00
348/148
2003/0128103 A1 7/2003 Fitzpatrick et al.
(Continued)

FOREIGN PATENT DOCUMENTS

DE    102010001323 A1    8/2010
FR    2971878 A1    8/2012

OTHER PUBLICATIONS

Search Report for International Patent Application No. PCT/EP2014/054071; dated Nov. 5, 2014.

*Primary Examiner* — Jennifer N To
*Assistant Examiner* — Ashley M Fortino
(74) *Attorney, Agent, or Firm* — Barnes & Thornburg LLP (57) ABSTRACT

A method and an apparatus for providing a graphical user interface in a vehicle. The method involves graphical objects displayed completely visibly on a display panel in a first mode of operation of a display apparatus, the graphical objects are divided into a first set of graphical objects and a second set of graphical objects. In a second mode of operation, the display panel is reduced and the display panel is divided into a visible portion and a nonvisible portion so that, following a change from the first mode of operation to the second mode of operation, the graphical objects in the first set are displayed completely on the visible portion of the display panel and the graphical objects in the second set are at least to some extent not displayed on the visible portion of the display panel.

12 Claims, 5 Drawing Sheets

(51) Int. Cl.
  *G06F 3/0488* (2013.01)
  *B60K 35/00* (2006.01)
  *B60K 37/02* (2006.01)
  *G06F 3/01* (2006.01)

(52) U.S. Cl.
  CPC ............ *G06F 3/017* (2013.01); *G06F 3/0482* (2013.01); *G06F 3/04883* (2013.01); *G06F 3/04886* (2013.01); *B60K 2350/1052* (2013.01); *B60K 2350/405* (2013.01)

(56) References Cited

U.S. PATENT DOCUMENTS

| | | | |
|---|---|---|---|
| 2008/0211693 A1 | 9/2008 | Okuno et al. | |
| 2010/0199227 A1* | 8/2010 | Xiao | G06F 3/0481 715/863 |
| 2012/0212430 A1* | 8/2012 | Jung | G06F 1/1626 345/173 |
| 2013/0061266 A1* | 3/2013 | Chai | H04N 5/44543 725/41 |

* cited by examiner

FIG. 5c

METHOD AND APPARATUS FOR PROVIDING A GRAPHICAL USER INTERFACE IN A VEHICLE

PRIORITY CLAIM

This patent application is a U.S. National Phase of International Patent Application No. PCT/EP2014/054071, filed 3 Mar. 2014, the disclosure of which is incorporated herein by reference in its entirety.

FIELD

Illustrative embodiments relate to a method and an apparatus for providing a graphical user interface in a vehicle.

BACKGROUND

Is known to provide display apparatuses in vehicles, the display surfaces of which can be reduced. The display surface is frequently reduced by retracting the display apparatuses into a component of the vehicle, often the dashboard. If the vehicle has a retractable display apparatus of this type, only a smaller display surface is viewable in the retracted state of the display apparatus. Only a few display contents can then be displayed on this reduced display surface. Alternatively, all display contents can still be displayed. However, these contents must then be presented in reduced form. This, however, can produce the result that the display contents can only be recognized with difficulty.

The display contents can no longer be displayed, or can be displayed only in segments or reduced on the reduced display surface.

Disclosed embodiments provide a method and an apparatus which enable display contents to be displayed in a reduced state of a display surface in the form and size in which they are also displayed on the non-reduced display surface.

BRIEF DESCRIPTION OF THE FIGURES

The disclosed embodiments are explained below with reference to the drawings.

DETAILED DESCRIPTION OF THE DISCLOSED EMBODIMENTS

In the disclosed method, graphical objects are displayed completely on a display surface in a first operating mode of a display apparatus. The graphical objects are divided into a first set of graphical objects and a second set of graphical objects. Furthermore, the display surface is reduced in a second operating mode of the display apparatus. The display surface is divided into a viewable part and a non-viewable part, so that, following a change from the first operating mode to the second operating mode, the graphical objects of the first set are displayed completely on the viewable part of the display surface and the graphical objects of the second set are at least partially not displayed on the viewable part of the display surface. An operating action of a user is detected in the second operating mode. When the operating action has been detected, the graphical objects of the second set are arranged on the display surface in such a way that at least one of the graphical objects of the second set is displayed completely on the viewable part of the display surface.

The number of graphical objects which the first or the second set of graphical objects comprises is dependent on the size of the display surface. In particular, the number of graphical objects should be selected in such a way that the graphical objects have a size in which they can be easily recognized by the vehicle occupants. The number of graphical objects may, in particular, lie within a range from one graphical object to twelve graphical objects per set. Each set may comprise six graphical objects. Particularly, each set comprises three graphical objects Viewable is understood within the meaning of the disclosed embodiments as viewable from the passenger compartment of the vehicle. In particular, the graphical objects are intended to be viewable by the vehicle occupants sitting on the vehicle seats. Since the driver or the front-seat passenger normally operate devices of the vehicle, the graphical objects should be viewable, in particular, from the driver's or front passenger's seat.

When the display apparatus is operated in the second operating mode, the non-viewable part of the display surface can be controlled in such a way that display contents are no longer displayed on the non-viewable part of the display surface. In this area, the display surface is, in particular, blacked out or a screensaver is activated. Alternatively, the display contents can be displayed in the non-viewable part of the display surface in the second operating mode also, although they are not viewable.

In at least one disclosed embodiment, the non-viewable part of the display surface is hidden by a passenger compartment cover of the vehicle in the second operating mode. In particular, the graphical objects of the second set are displayed completely on the non-viewable part of the display surface.

In particular, the display apparatus is moved during the change from the first operating mode to the second operating mode in such a way that the passenger compartment cover hides the non-viewable part of the display surface. The second set of graphical objects is arranged on the non-viewable part of the display surface. The graphical objects then disappear completely from the field of view of a user. The display apparatus is therefore, in particular, a movable display apparatus. The size of the viewable display surface can be modified by the movement of the display apparatus. This may be desirable, for example, in different driving modes. An excessively large screen may be disturbing, particularly during journeys at high speeds, e.g. freeway journeys, since it may restrict the field of view of the driver. It is therefore desirable to reduce the display apparatus during journeys at high speed. Also in the case of low ambient lighting, i.e., for example, during journeys at night, the light emitted by a large screen may disturb the driver. It may therefore be desirable to reduce the light-emitting surface during journeys in darkness.

In a further disclosed embodiment, the operating action is a gesture of a user. In the second operating mode, a detection area is formed in front of the viewable and/or the non-viewable part of the display surface, wherein the gesture is detected in the detection area. The detection area is formed not only in front of the viewable part, but, in particular, also in front of the non-viewable part of the display surface. The user can thereby also instigate a modification of the display contents on the viewable part of the display surface if he performs the gesture in front of the non-viewable part of the display surface, i.e. in front of the passenger compartment cover. Performing a gesture in front of the passenger compartment cover is intuitive for the user particularly if he would like to bring a display content onto the viewable part of the display surface, if he knows that the content is located on the non-viewable part of the display surface.

A gesture is understood within the meaning of the disclosed embodiments as a specific positioning of the hand of a user or a specific movement that is performed with the hand of the user. The gestures are performed in a detection area in front of the display surface without a touch of the display surface being required. Through the control of the user interface of the vehicle by means of gestures, the user is provided with a particularly simple and intuitive input facility for controlling the display content on the display surface or devices of the vehicle. In particular, the gesture is a swiping gesture. The swiping gesture may comprise, in particular, an essentially horizontal or essentially vertical movement in front of the display surface.

In particular, the first set of graphical objects comprises the same number of graphical objects as the second set of graphical objects. Furthermore, the positions of the graphical objects of the first and the second set on the display surface are determined. When the operating action has been detected, at least the graphical objects of the second set are displayed on the positions of the graphical objects of the first set. If the first and the second set therefore have the same number of graphical objects, all graphical objects of the second set can be displayed as completely viewable. The graphical objects of the first set can then either be reduced or no longer displayed at all. For example, the graphical objects of the first set can be displayed on the positions of the graphical objects of the second set. By means of a simple gesture, the user can therefore ensure that the graphical objects which are normally displayed as no longer viewable are again viewable in their original size.

Alternatively, the graphical objects of the first set and the second set can also be displayed as a stack view, wherein the graphical objects of the second set then form the topmost object displayed in the stack. As a result, the graphical objects of the first set do not disappear completely from the viewable part of the display surface.

In a different disclosed embodiment of the method, the operating action is a swiping gesture of a user which can be performed by means of an actuation element. A first graphical object of the first set in a first position on the display surface is determined, the swiping gesture beginning at the object. Furthermore, a trajectory of the actuation element is detected in the detection area. A second graphical object of the second set in a second position on the display surface is determined, the object being closest to an end point of the trajectory. The end point of the trajectory is the point at which the actuation element leaves the detection area. When the actuation element has left the detection area, the second graphical object is displayed at the first position and the first graphical object is displayed at the second position. This design is useful, particularly if the user is to exchange only one graphical object which is displayed as viewable for him. If the display in the first operating mode is a startup screen display, i.e. the display that is always displayed when the user interface is switched on, the user will subconsciously memorize this startup screen display after multiple use of the user interface. Following a certain usage period, the user therefore knows which graphical object is located at which position on the display surface. As a result, he can guide the trajectory of the actuation element simply into the vicinity of the graphical object required by him. The actuation element may, in particular, be the hand or a finger of the user.

The first set of graphical objects may comprise at least a first row of graphical objects arranged next to one another and the second set of graphical objects comprises at least a second row of objects arranged next to one another. In particular, the graphical objects of the first row and the second row are arranged directly below one another. The graphical objects are then displayed in a matrix. As a result, the user can simply memorize the positions of the different graphical objects.

In particular, at least the second set of graphical objects comprises operable switching elements. As a result, functions which are operated with a switching element displayed on the non-viewable part of the display surface remain operable in the second operating mode of the display apparatus also.

A switching element is understood within the meaning of the disclosed embodiments as a control element of a graphical user interface. A switching element differs from elements and surfaces for pure information display, referred to as display elements or display surfaces, in that they are selectable. If a switching element is selected, a function assigned to it is performed. The function may result in a modification of the information display. Furthermore, devices whose operation is supported by the information display can be controlled via a switching element. The switching elements can thus replace conventional mechanical switches. The switching elements can be produced as required for a freely programmable display surface and can be displayed by the latter. Furthermore, it can be provided that a switching element can be marked. In this case, the assigned function is not yet performed. The marked switching element is, however, presented as highlighted in relation to other switching elements. Only when the switching element is selected is the function assigned to it performed.

Furthermore, the disclosed embodiments relate to an apparatus for providing a graphical user interface in a vehicle. The apparatus comprises a display apparatus, wherein the display apparatus is operable in a first operating mode in which graphical objects are completely displayable on a display surface, wherein the graphical objects are divided into a first set of graphical objects and a second set of graphical objects. Furthermore, the display apparatus is operable in a second operating mode in which the display surface is reducible, wherein the display surface is divided into a viewable and a non-viewable part so that, following a change from the first operating mode to the second operating mode, the graphical objects of the first set are completely displayable on the viewable part of the display surface and the graphical objects of the second set are at least partially not displayable on the viewable part of the display surface. Furthermore, the apparatus comprises a detection unit by means of which an operating action of a user is detectable in the second operating mode of the display apparatus. Finally, the apparatus comprises a control unit by means of which the display apparatus is controllable in such a way that, in the second operating mode, when the operating action has been detected, the graphical objects of the second set are arrangeable on the display surface in such a way that at least one of the graphical objects of the second set is completely displayable on the display surface. The disclosed apparatus is particularly suitable for carrying out the disclosed method.

In at least one disclosed embodiment of the apparatus, the apparatus comprises a passenger compartment cover into which the display apparatus is retractable. The first operating mode is, in particular, a full-screen mode in which the display apparatus is not retracted, and the second operating mode is a partial-screen mode in which the viewable part of the display surface is not retracted and the non-viewable part of the display surface is retracted.

In particular, the passenger compartment cover hides the view of the non-viewable part of the display surface in the second operating mode. The graphical objects of the second set are, in particular, at least partially arranged on the non-viewable part of the display surface.

The passenger compartment cover may be part of the dashboard of the vehicle. The display apparatus may be fitted in the dashboard and can be retracted into the dashboard. Particularly, when display apparatuses in the dashboard may disturb the field of view of the driver, the display apparatuses can be retracted in certain situations. However, with the disclosed apparatus, all functions and information continue to be displayable and operable in their original size.

In a further disclosed embodiment of the apparatus, a detection area in which the operating action is detectable is formed in the second operating mode in a space in front of the display apparatus, wherein the detection area is formed in front of the viewable part of the display surface and/or the passenger compartment cover. An operating action can then also be detected in front of the viewable part of the display surface. This is particularly intuitive if the user knows that the graphical object required by him is located on the non-viewable retracted part of the display surface.

Furthermore, the disclosed embodiments relate to a vehicle which comprises an apparatus.

Figure 1:
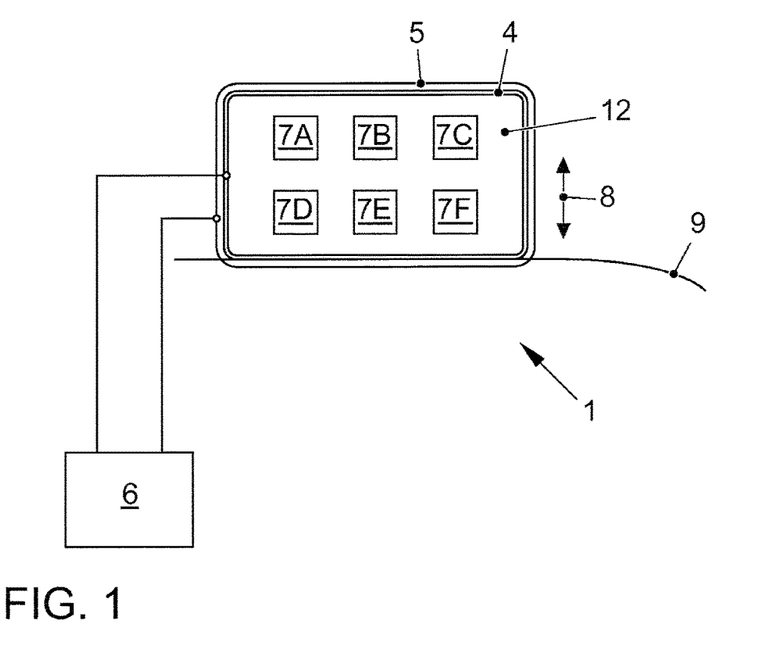
FIG. 1 shows an example embodiment of the disclosed apparatus.
Figure 2:
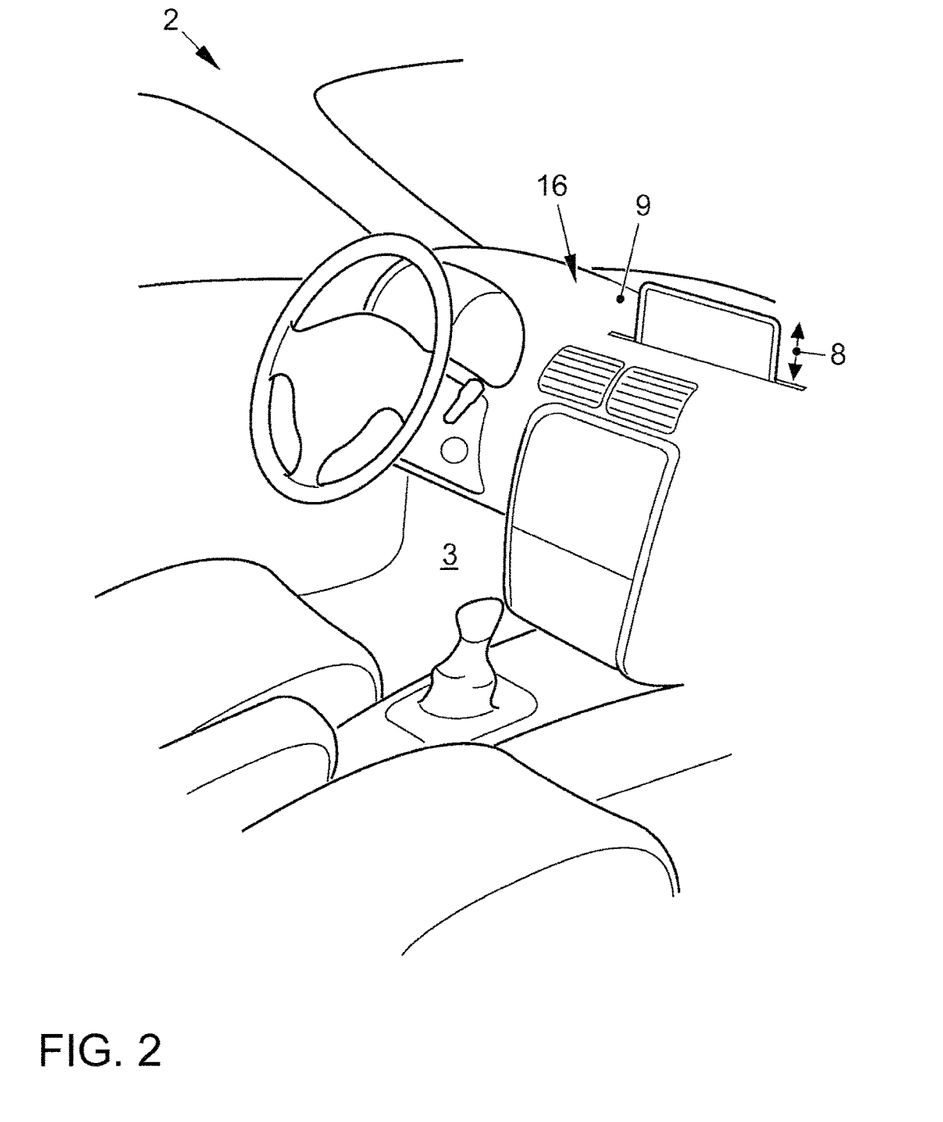
FIG. 2 shows an example of an arrangement of the apparatus in a vehicle.
Figure 3:
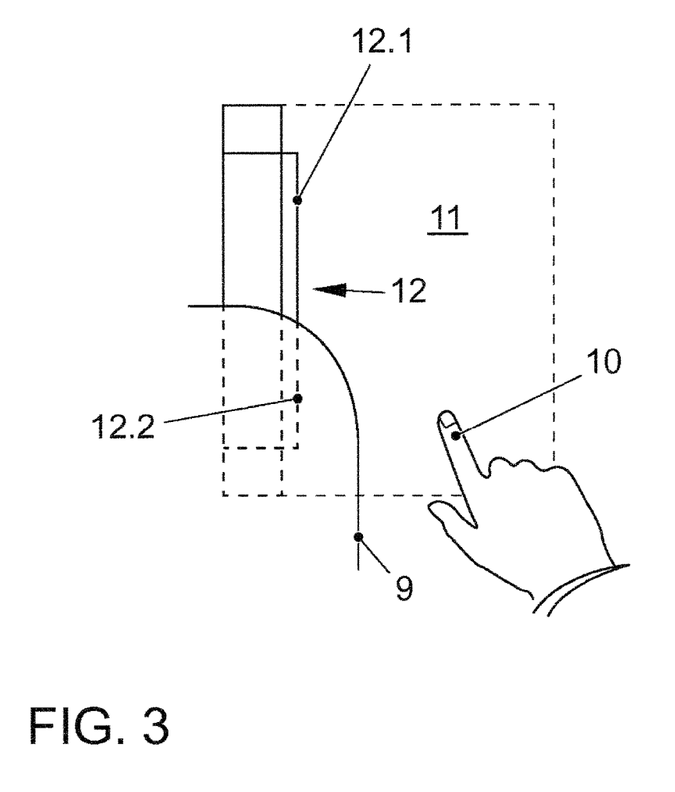
FIG. 3 shows a sectional view of the display apparatus of the example embodiment of the apparatus with a formed detection area.

With reference to FIGS. 1, 2 and 3, an example embodiment of an apparatus 1 and an arrangement of the apparatus 1 in a passenger compartment 3 of a vehicle 2 is explained.

The apparatus 1 comprises a display apparatus 4 on which a plurality of graphical objects 7A to 7F are displayable. The graphical objects 7A to 7F are formed as switching elements which can be operated via touches of the display surface 12 with an operating element 10, for example a finger. The display surface 12 is fitted with a touch-sensitive surface for this purpose.

The display apparatus 4 is furthermore disposed in the passenger compartment 3 of the vehicle 2 in such a way that it can be retracted into a passenger compartment cover 9 which, in the example embodiment, belongs to the dashboard 16 of the vehicle 2. This is indicated by the arrow 8. The display apparatus 4 can be retracted either manually, e.g. by the driver pressing a button, or automatically depending on a driving mode. An excessively large display surface 12 in the field of view of the driver may, for example on freeway journeys, be disturbing. The display apparatus 4 can therefore be retracted automatically when the vehicle has reached a specific speed. However, the driver may feel disturbed, particularly during journeys at night due to excessive light that is emitted by the display surface 12 of the display apparatus 4 and can reduce the display surface 12 by pressing a button.

The display apparatus 4 is therefore operable in two operating modes. A first operating mode represents a full-screen mode. This means that the display surface 12 of the display apparatus 4 is completely viewable, i.e. in its full size, from the passenger compartment 3 of the vehicle 2. In particular, the display surface 12 can be viewed by the driver on the driver's seat of the vehicle 2 in full-screen mode in its full size.

A second operating mode comprises a partial-screen mode. This means that the display apparatus 4 is inserted or retracted to a specific depth into the passenger compartment cover 9 of the dashboard 16. The display surface 12 viewable for the vehicle occupants is thereby reduced. The display contents located on the non-viewable part 12.2 of the display surface 12 are then no longer or no longer completely viewable.

The display apparatus 4 is furthermore connected to a detection unit 5. An actuation element 10, e.g. a hand or a fingertip of the user, is detectable in a detection area 11 by means of the detection unit 5, particularly in the second operating mode. The detection area 11 is shown in detail in FIG. 3. In particular, the detection area 11 is also formed in front of the non-viewable part 12.2 of the display surface 12 which is not viewable in the second operating mode. This means that the detection area 11 is partially formed in front of the passenger compartment cover 9.

In the example embodiment described here, the detection area 11 forms at least a volume in front of the non-viewable part 12.1 of the display surface 12 and in front of the part of the passenger compartment cover 9 behind which the non-viewable part 12.2 of the display surface is located. In particular, a cuboid is formed which completely surrounds both parts 12.1 and 12.2 of the display surface 12 with its lateral surfaces in the extension which runs parallel to the display surface 12. In a direction perpendicular to the display surface 12, the cuboid reaches from the display surface 12 or immediately in front of the display surface 12 to a distance of e.g. around 60 cm. As a result, the detection area 11 is also formed, in particular, in front of the passenger compartment cover 9. The distance of the outer boundary of the detection area 11 in front of the display surface 12 is selected in such a way that an operating action in the detection area 11 can be detected in such a timely manner that the display on the display surface 12 can be modified early enough. Furthermore, the distance of the detection area 11 from the display surface 12 should be selected so that the actuation element 10 is moved as infrequently as possible into the detection area 11 if no operation via the display apparatus 4 is intended.

The detection unit 5 transmits the current position of an actuation element 10 in the detection area 11 continuously to a control unit 6 connected to the display apparatus 4. The control unit 6 can modify the display on the display surface 12 depending on this signal.

A first example embodiment of the disclosed method is explained with reference to FIGS. 4a to 4c.

Figure 4A:
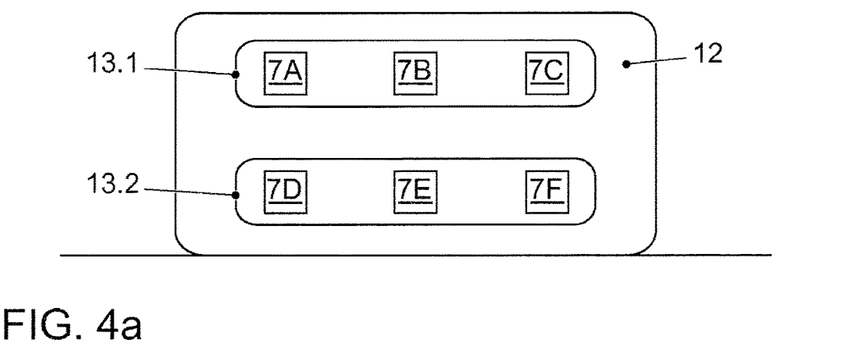
FIGS. 4a to 4c show the views on the display surface of the display apparatus in the course of a first example embodiment of the method.
Figure 4B:
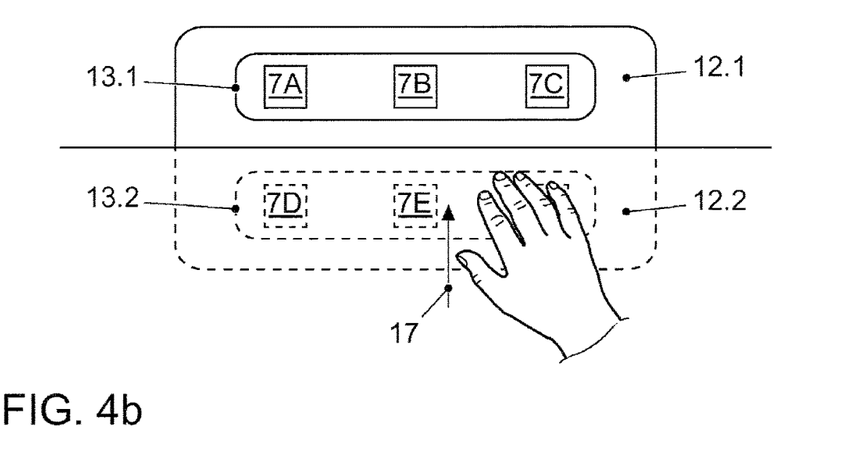
Figure 4C:
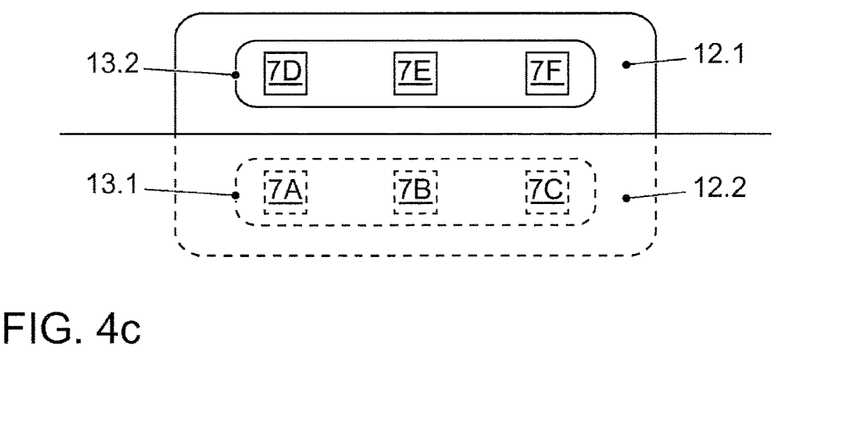

The initial situation is the full-screen mode shown in FIG. 4a. The six graphical objects 7A to 7F are displayed as completely viewable on the display surface 12. The graphical objects 7A to 7F are divided into two sets 13.1 and 13.2. The first set 13.1 comprises the graphical objects 7A to 7C and the second set 13.2 the graphical objects 7D to 7F. The division of the graphical objects 7A to 7F into the sets 13.1 and 13.2 is stored internally in the control unit 6 only and is not viewable for the user on the display surface 12. Furthermore, the graphical objects 7A to 7C of the first set 13.1 are arranged next to one another in an upper row. The graphical objects 7D to 7F of the second set 13.2 are arranged in a lower row next to one another. The graphical objects 7A to 7F of the two sets 13.1 and 13.2 are furthermore arranged below one another in such a way that the graphical objects 7A and 7D, 7B and 7E and the graphical objects 7C and 7F are arranged directly below one another. The objects 7A to 7F can be divided unambiguously and clearly along a line. Furthermore, the user can thus easily memorize the positions of the different graphical objects 7A to 7F.

When the user presses a button, the display apparatus 4 is set in motion. The display apparatus 4 changes from the first operating mode to the second operating mode due to the movement. The display apparatus 4 is retracted into the passenger compartment cover 9 of the dashboard 16 until half of the display surface 12 is hidden by the passenger compartment cover 9. This therefore means that only the part 12.1 of the display surface 12 is viewable from the passenger compartment 3 of the vehicle 2. Conversely, the other part 12.2 of the display surface 12 is no longer viewable, since it is hidden by the passenger compartment cover 9.

The arrangement of the graphical objects 7A to 7F on the display surface 12 is not modified. The lower row of the graphical objects 7D to 7F located on the part 12.2 of the display surface 12 that is no longer viewable is therefore also no longer viewable. Functions associated with the graphical objects 7D to 7F that are no longer viewable can therefore also no longer be operated.

If the user then wishes to operate one of the functions operable only with the buttons 7D to 7F, he brings the actuation element 10, for example his hand or his finger, into the detection area 11 and performs an upward movement, i.e. a swiping gesture 17 aimed in the direction of the vehicle roof. Since the user intends to bring the lower, no longer viewable row up onto the viewable part 12.1 of the display surface 12 with the swiping gesture, a swiping gesture 17 of this type is particularly intuitive.

The swiping gesture 17 is detected by the detection unit 5 in the detection area 11. Furthermore, it is detected that the swiping gesture 17 is an operating action with which the first set 13.1 or lower row is to be exchanged with the second set 13.2 or upper row.

The detection unit 5 communicates to the control unit 6 that the swiping gesture 17 has been performed.

The control unit 6 then initially determines the position of the graphical objects 7A to 7F. The control unit 6 controls the display surface 12 of the display apparatus 4 in such a way that the two rows or the two sets 13.1 and 13.2 are displayed as transposed. This means that the graphical object 7D is displayed at the initial position of the graphical object 7A, the graphical object 7E at the initial position of the graphical object 7B, and the graphical object 7F at the initial position of the graphical object 7C. The graphical objects 7D to 7F previously no longer viewable can now be operated once more.

If the user again wishes to operate one of the switching elements 7A to 7C, he again performs an upward swiping gesture 17 in the detection area 11.

An upward swiping gesture 17 is particularly intuitive. Alternatively, a swiping gesture 17 can also be performed in any other spatial direction in the detection area 11, for example a vertical movement. Alternatively, a gesture may also be the operating action comprising no translational movement of the actuation element 10, i.e., for example, an opening of a clenched fist.

The size of the graphical objects 7A to 7F does not have to be modified to display it as completely viewable on the viewable part 12.1 of the display surface 12.

A second example embodiment of the disclosed method is explained with reference to FIGS. 5*a* to 5*c*.

Figure 5A:
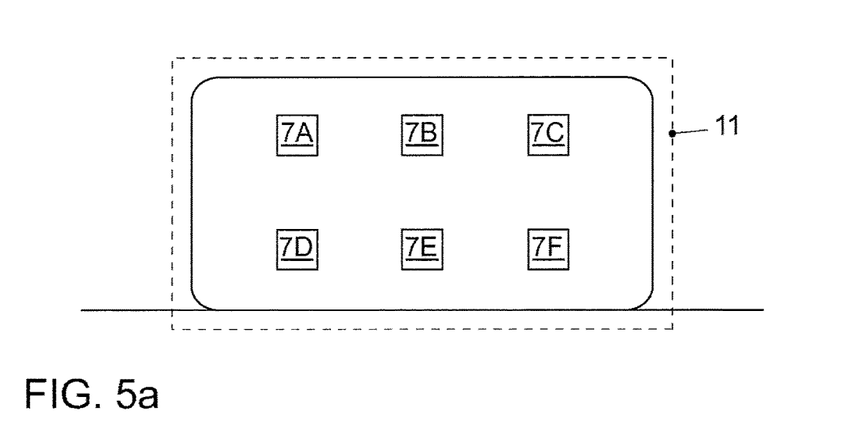
FIGS. 5a to 5c show the views on the display surface of the display apparatus in the course of a second example embodiment of the method.
Figure 5B:
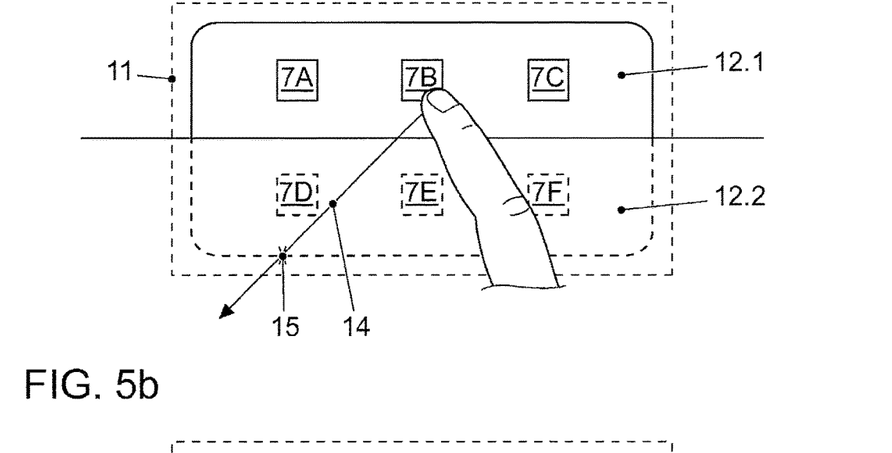
Figure 5C:
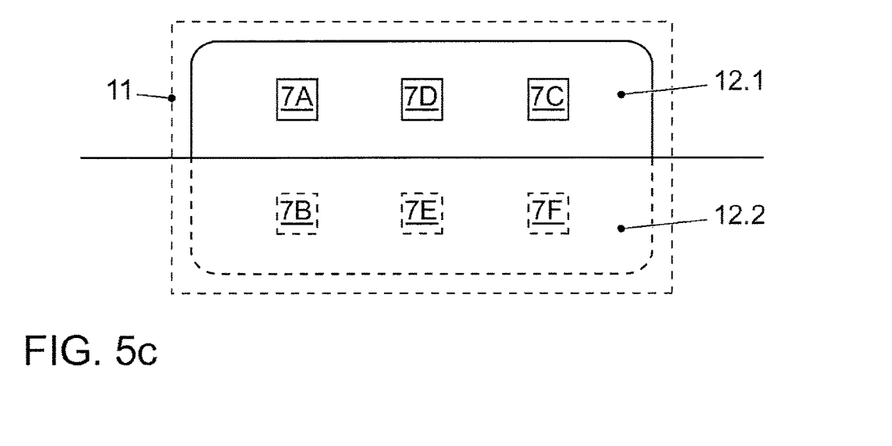

The initial situation is again the full-screen mode already explained with FIG. 4*a*, which is shown again in FIG. 5*a*. Furthermore, the detection area 11 formed around the display surface 12 is shown from the front view.

The display apparatus 4 is moved into the second operating mode in the same way as described in the first example embodiment of the method.

The user now merely intends to bring a graphical object 7D onto the viewable part 12.1 of the display surface 12. To do this, the user must know where the graphical object 7D is approximately located on the non-viewable part 12.2 of the display surface 12. This is particularly the case if the user already frequently uses the graphical user interface. Since a graphical user interface arranged in a vehicle 2 is used whenever the user drives a vehicle 2, the positions of the graphical objects 7A to 7F are subconsciously memorized by the user after multiple use. Furthermore, if the user can himself configure the startup screen, for example via "drag-and-drop" actions, it becomes particularly simple for the user to memorize the positions of the graphical objects 7A to 7F, since he has positioned them himself.

The user brings the actuation element 10 into the detection area 11. Furthermore, he selects one of the three graphical objects 7A to 7C that he wishes to exchange for the graphical object 7D, for example the graphical object 7B. To do this, he points at the graphical object 7B. The position of the actuation element 10 in the detection area 11 is initially determined by the detection unit 5. The position of the actuation element 10 is communicated to the control unit 6 which in turn determines the position of the probably selected graphical object 7B on the display surface 12. The closer the actuation element 10 is to the display surface 12, the more precise the determination of the selected graphical object 7B. To differentiate from a random movement of the actuation element in the detection area 11, it is furthermore detected how long the user points his finger at the object 7B. If the duration exceeds a predetermined time interval, which lies, for example, within a range from 0.5 to 2.5 seconds, the pointing of the finger at the graphical object 7B is deemed to be the start of the operating action. Alternatively, the user can select the graphical object 7B by touch.

The user then moves the actuation element 10 obliquely down to the left in the direction of the graphical object 7D, wherein the approximate position of the graphical object 7D on the non-viewable part 12.2 of the display 12 is known to the user. It is not necessary for the user to move the actuation element exactly over the location at which the graphical object 7D is positioned, since he cannot after all see it. Instead, the trajectory 14 with which the actuation element 10 is guided through the detection area 11 is detected by the detection unit 5. The point at which the actuation element 10 leaves the detection area 11 is determined as the end point 15 of the trajectory 14. The graphical object 7D that is displayed closest to the end point 15 on the non-viewable part 12.2 of the display surface 12 is then determined as the graphical object 7D to 7F which is to be displayed at the position of the graphical object 7B. As a result, the user avoids having to strike a precise position of the graphical object 7D to 7F with the actuation element 10. Furthermore, the user may also opt for a different graphical object 7E or 7F during the operating action. As long as he has not left the detection area 11 with the actuation element 10, the graphical object 7B and 7D are not exchanged.

If the end point 15 happens to be located at the same distance from two graphical objects 7D to 7F arranged next to one another, for example between the graphical objects 7D and 7E, the graphical object 7D or 7E which the user has used more frequently in the past is determined as the graphical object 7D to 7F to be exchanged.

The movement of the display apparatus 4 can also be initiated automatically rather than manually in both methods. This can happen, for example, if a specific speed is exceeded, or if the ambient brightness falls below a specific value.

Both methods can also be combined with one another. All graphical objects 7D to 7F displayed on the non-viewable part 12.2 of the display surface 12 can therefore be exchanged by means of a horizontal swiping gesture 17 with the graphical objects 7A to 7C displayed on the viewable part 12.1 of the display surface 12. Conversely, if the pointing of the finger at the graphical object 7B is detected, only the graphical object 7B is exchanged with the required graphical object 7D.

Is known to provide display apparatuses in vehicles, the display surfaces of which can be reduced. The display surface is frequently reduced by retracting the display apparatuses into a component of the vehicle, often the dashboard. If the vehicle has a retractable display apparatus of this type, only a smaller display surface is viewable in the retracted state of the display apparatus. Only a few display contents can then be displayed on this reduced display surface. Alternatively, all display contents can still be displayed. However, these contents must then be presented in reduced form. This, however, can produce the result that the display contents can only be recognized with difficulty.

US 2003/0128103 A1 describes an insertable display which has two display portions. The first display portion is viewable in the retracted and extended state of the display and the second display portion is viewable only in the extended state of the display. Mainly display contents of the basic functions of the vehicle, such as, for example, temperature, fan speed or a radio station, are then displayed on the first display portion. Mainly display contents of additional functions, such as, for example, short messages that have been received via a telephone, are displayed on the second display portion.

DE 10 2010 001 323 A1 describes a vehicle navigation system with a movable display apparatus. A navigation view is displayed in a full-screen mode. When the display apparatus is partially retracted, the navigation display is displayed in a smaller display panel.

The display contents can no longer be displayed, or can be displayed only in segments or reduced on the reduced display surface.

Disclosed embodiments provide a method and an apparatus which enable display contents to be displayed in a reduced state of a display surface in the form and size in which they are also displayed on the non-reduced display surface.

REFERENCE NUMBER LIST

1 Apparatus
2 Vehicle
3 Passenger compartment of the vehicle
4 Display apparatus
5 Detection unit
6 Control unit
7A-7F Graphical objects
8 Direction of movement of the display apparatus
9 Passenger compartment cover
10 Actuation element
11 Detection area
12 Display surface
12.1 Viewable part of the display surface
12.2 Non-viewable part of the display surface
13.1 First set of graphical objects
13.2 Second set of graphical objects
14 Trajectory of the actuation element
15 End point of the trajectory
16 Dashboard
17 Gesture of the user

The invention claimed is:

1. A method for providing a graphical user interface in a transportation vehicle, the method comprising:
    displaying graphical objects completely on a display surface in a first operating mode of a display apparatus, wherein the graphical objects are divided into a first set of graphical objects and a second set of graphical objects;
    reducing the display surface in a second operating mode of the display apparatus, wherein the display surface is divided into a viewable part and a non-viewable part, so that, following a change from the first operating mode to the second operating mode, the graphical objects of the first set are displayed completely on the viewable part of the display surface and the graphical objects of the second set are at least partially not displayed on the viewable part of the display surface, and wherein a detection area is formed in front of the viewable and/or the non-viewable part of the display surface;
    detecting an operating action of a user in the second operating mode; and
    arranging the graphical objects of the second set on the display surface in response to detection of the operating action during the second operating mode so that at least one of the graphical objects of the second set is displayed completely on the viewable part of the display surface and at least one of the graphical objects of the first set is at least partially hidden from view by a passenger compartment cover of the transportation vehicle, wherein the operating action is a swiping gesture of a user which can be performed by an actuation element, a first graphical object of the first set in a first position on the display surface is determined, the swiping gesture beginning at said object, a trajectory of the actuation element is detected in the detection area, a second graphical object of the second set in a second position on the display surface is determined, said object being closest to an end point of the trajectory, wherein the end point of the trajectory is the point at which the actuation element leaves the detection area, and when the actuation element has left the detection area, the second graphical object is displayed at the first position and the first graphical object is displayed at the second position.

2. The method of claim 1, wherein the non-viewable part of the display surface is hidden by a passenger compartment cover of the transportation vehicle in the second operating mode.

3. The method of claim 2, further comprising moving the display apparatus during the change from the first operating mode to the second operating mode in such a way that the passenger compartment cover hides the non-viewable part of the display surface, wherein the second set of graphical objects is arranged on the non-viewable part of the display surface.

4. The method of claim 1, wherein the first set of graphical objects comprises the same number of graphical objects as the second set of graphical objects, the positions of the graphical objects of the first and the second set on the display surface are determined, and when the operating action has been detected, at least the graphical objects of the second set are displayed on the positions of the graphical objects of the first set.

5. The method of claim 1, wherein the first set comprises at least a first row of graphical objects arranged next to one another and the second set comprises at least a second row of graphical objects arranged next to one another.

6. The method of claim 1, wherein at least the second set of graphical objects comprises operable switching elements.

7. An apparatus for providing a graphical user interface in a transportation vehicle, the apparatus comprising:
a display apparatus;
wherein the display apparatus is operable in a first operating mode in which graphical objects are completely displayable on a display surface, the graphical objects are divided into a first set of graphical objects and a second set of graphical objects, and
wherein the display apparatus is operable in a second operating mode in which the display surface is reducible,
wherein the display surface is divided into a viewable and a non-viewable part so that, following a change from the first operating mode to the second operating mode, the graphical objects of the first set are completely displayable on the viewable part of the display surface and the graphical objects of the second set are at least partially displayable on the non-viewable part of the display surface, and wherein a detection area is formed in front of the viewable and/or the non-viewable part of the display surface;
a detection unit by which an operating action of a user is detectable in the second operating mode of the display apparatus; and
a control unit by which the display apparatus is controllable in such a way that, in response to detection of the operating action during the second operating mode, the graphical objects of the second set are arrangeable on the display surface so that at least one of the graphical objects of the second set is completely displayable on the display surface and at least one of the graphical objects of the first set is at least partially hidden from view by a passenger compartment cover of the transportation vehicle, wherein the operating action is a swiping gesture of a user which can be performed by an actuation element, a first graphical object of the first set in a first position on the display surface is determined, the swiping gesture beginning at said object, a trajectory of the actuation element is detected in the detection area, a second graphical object of the second set in a second position on the display surface is determined, said object being closest to an end point of the trajectory, wherein the end point of the trajectory is the point at which the actuation element leaves the detection area and when the actuation element has left the detection area, the second graphical object is displayed at the first position and the first graphical object is displayed at the second position.

8. The apparatus of claim 7, wherein the apparatus comprises a passenger compartment cover into which the display apparatus is retractable, wherein the first operating mode is a full-screen mode in which the display apparatus is not retracted, and the second operating mode is a partial-screen mode in which the viewable part of the display surface is not retracted and the non-viewable part of the display surface is retracted.

9. The apparatus of claim 8, wherein the passenger compartment cover hides the view of the non-viewable part of the display surface in the second operating mode.

10. The apparatus of claim 8, the passenger compartment cover is part of the dashboard of the transportation vehicle.

11. The apparatus of claim 8, wherein a detection area in which the operating action is detectable is formed in the second operating mode in a space in front of the display surface, wherein the detection area is formed in front of the viewable part of the display surface and/or the passenger compartment cover.

12. A transportation vehicle with an apparatus for providing a graphical user interface the apparatus comprising:
a display apparatus;
wherein the display apparatus is operable in a first operating mode in which graphical objects are completely displayable on a display surface, the graphical objects are divided into a first set of graphical objects and a second set of graphical objects, and
wherein the display apparatus is operable in a second operating mode in which the display surface is reducible,
wherein the display surface is divided into a viewable and a non-viewable part so that, following a change from the first operating mode to the second operating mode, the graphical objects of the first set are completely displayable on the viewable part of the display surface and the graphical objects of the second set are at least partially displayable on the non-viewable part of the display surface, and wherein a detection area is formed in front of the viewable and/or the non-viewable part of the display surface;
a detection unit by which an operating action of a user is detectable in the second operating mode of the display apparatus; and
a control unit by which the display apparatus is controllable in such a way that, in response to detection of the operating action during the second operating mode, the graphical objects of the second set are arrangeable on the display surface so that at least one of the graphical objects of the second set is completely displayable on the display surface and at least one of the graphical objects of the first set is at least partially hidden from view by a passenger compartment cover of the transportation vehicle, wherein the operating action is a swiping gesture of a user which can be performed by an actuation element, a first graphical object of the first set in a first position on the display surface is determined, the swiping gesture beginning at said object, a trajectory of the actuation element is detected in the detection area, a second graphical object of the second set in a second position on the display surface is determined, said object being closest to an endpoint of the trajectory, wherein the end point of the trajectory is the point at which the actuation element leaves the detection area, and when the actuation element has left the detection area, the second graphical object is displayed at the first position and the first graphical object is displayed at the second position.

* * * * *